United States Patent
Lin

(12) United States Patent (10) Patent No.: US 8,345,337 B2
Lin (45) Date of Patent: Jan. 1, 2013

(54) POLYGON MIRROR DEVICE WITH DISCONTINUOUS ANGLES OF REFLECTIONS

(75) Inventor: Hsin-yun Lin, Tantz Shiang (TW)

(73) Assignee: Asia Optical International Ltd., Tortola (VG)

( * ) Notice: Subject to any disclaimer, the term of this patent is extended or adjusted under 35 U.S.C. 154(b) by 89 days.

(21) Appl. No.: 12/916,440

(22) Filed: Oct. 29, 2010

(65) Prior Publication Data

US 2011/0102872 A1 May 5, 2011

(30) Foreign Application Priority Data

Oct. 30, 2009 (TW) .............................. 98136941 A

(51) Int. Cl.
*G02B 26/08* (2006.01)
(52) U.S. Cl. ................ 359/219.2; 359/216.1; 359/220.1
(58) Field of Classification Search .... 359/201.1–201.2, 359/203.1, 216.1, 218.1–220.1
See application file for complete search history.

(56) References Cited

U.S. PATENT DOCUMENTS 4,738,499 A * 4/1988 Mikami et al. .................. 359/18

* cited by examiner

*Primary Examiner* — James Phan
(74) *Attorney, Agent, or Firm* — Cheng-Ju Chiang

(57) ABSTRACT

Disclosed is a polygon mirror device with discontinuous angles of reflections discontinuously to reflect a light beam from a light source with at least one angle. The polygon mirror device with discontinuous angles of reflections comprises a motor connecting with a base to rotate the base around a rotation axis. The base has an axial end surface to form a reference plane. The reference plane is approximately perpendicular to the rotation axis. A plurality of reflectors is positioned on the reference plane circularly around the rotation axis. The reflectors tilt relative to the reference plane with respective angles to form respective included angles. When the base is rotated around the rotation axis, at least one of the reflectors is moved to a reflecting location for receiving the light beam from the light source and reflects the light beam with an angle of reflection to form an image at a specific place.

13 Claims, 5 Drawing Sheets

POLYGON MIRROR DEVICE WITH DISCONTINUOUS ANGLES OF REFLECTIONS

BACKGROUND OF THE INVENTION

1. Field of the Invention

The present invention generally relates to a polygon (this term is proper without concern) mirror device, and more particularly to a polygon mirror device with discontinuous angles of reflections.

2. Description of Prior Art

In prior arts which a laser is employed as a light source in a scanning projector, a reflectors combination swing control by a MEMS (Micro Electro Mechanical System) is generally utilized for the scanning projection of the scanning projector. Alternatively, a multiple polygon mirrors rotating combination also can be utilized for the scanning projection. Speaking of the reflectors combination swing control, the MEMS lags the physical motion in the swing control because an air damping exists during the control of the swing angles of the reflectors and the damping oscillations of the reflectors and the whole MEMS, the control of swing angles of the reflectors in the MEMS has to be more considerate to precisely control the accuracy of the scanning projection procedure.

Mentioning about the multiple polygon mirrors rotating combination, the drawbacks of the aforesaid reflectors combination swing control by the MEMS can be avoided. Due to the angle control of the reflectors is discontinuous, the scanning projection time can be shortened and the aforesaid kinds of dampings also can be prevented to simplify the control procedure of the scanning projection. However, Most of the multiple polygon mirrors rotating combinations today change the angle discontinuously to control the angles of reflecting the light source. Meanwhile, all the compositions of the multiple polygon mirrors rotating combinations and respective driving motors occupy a quite large space which truly violates the almost mainstream of miniaturization design. Moreover, the high speed rotations of the multiple motors and the multiple polygon mirrors cause vibrations, noises of the whole scanning projector and lead to disadvantages of instability and a short usage lifetime of the products.

Consequently, there is a need to develop a polygon mirror device with discontinuous angles of reflections to efficiently solve the problems of laser light source scanning projector according to prior art.

SUMMARY OF THE INVENTION

An objective of the present invention is to provide a polygon mirror device with discontinuous angles of reflections to apply in a scanning projector for simplifying the control procedure of the scanning projection. With discontinuously controlling angles of reflections of a light beam from a light source, many disadvantages of the swing control of the MEMS (Micro Electro Mechanical System) can be reduced and the miniaturization design of the whole system can be further progressed.

The polygon mirror device with discontinuous angles of reflections of the present invention can be employed to reflect a light beam from a light source with at least one angle. The polygon mirror device with discontinuous angles of reflections of the present invention comprises a motor connecting with a base to rotate the base around a rotation axis. The base has an axial end surface to form a reference plane. The reference plane is approximately perpendicular to the rotation axis. A plurality of reflectors is positioned on the reference plane circularly around the rotation axis. The reflectors tilt relative to the reference plane with respective angles to form respective included angles. When the base is rotated around the rotation axis, at least one of the reflectors is moved (rotated) to a reflecting location for receiving the light beam from the light source and reflects the light beam with an angle of reflection so to form an image at a specific place.

The polygon mirror device with discontinuous angles of reflections of the present invention can simplify the control procedure of the scanning projection. With discontinuously controlling the angle of reflection of the light beam from the light source, the disadvantages of the swing control of the MEMS can be reduced and the miniaturization design of the whole system can be further progressed.

DETAILED DESCRIPTION OF THE INVENTION

Figure 1:
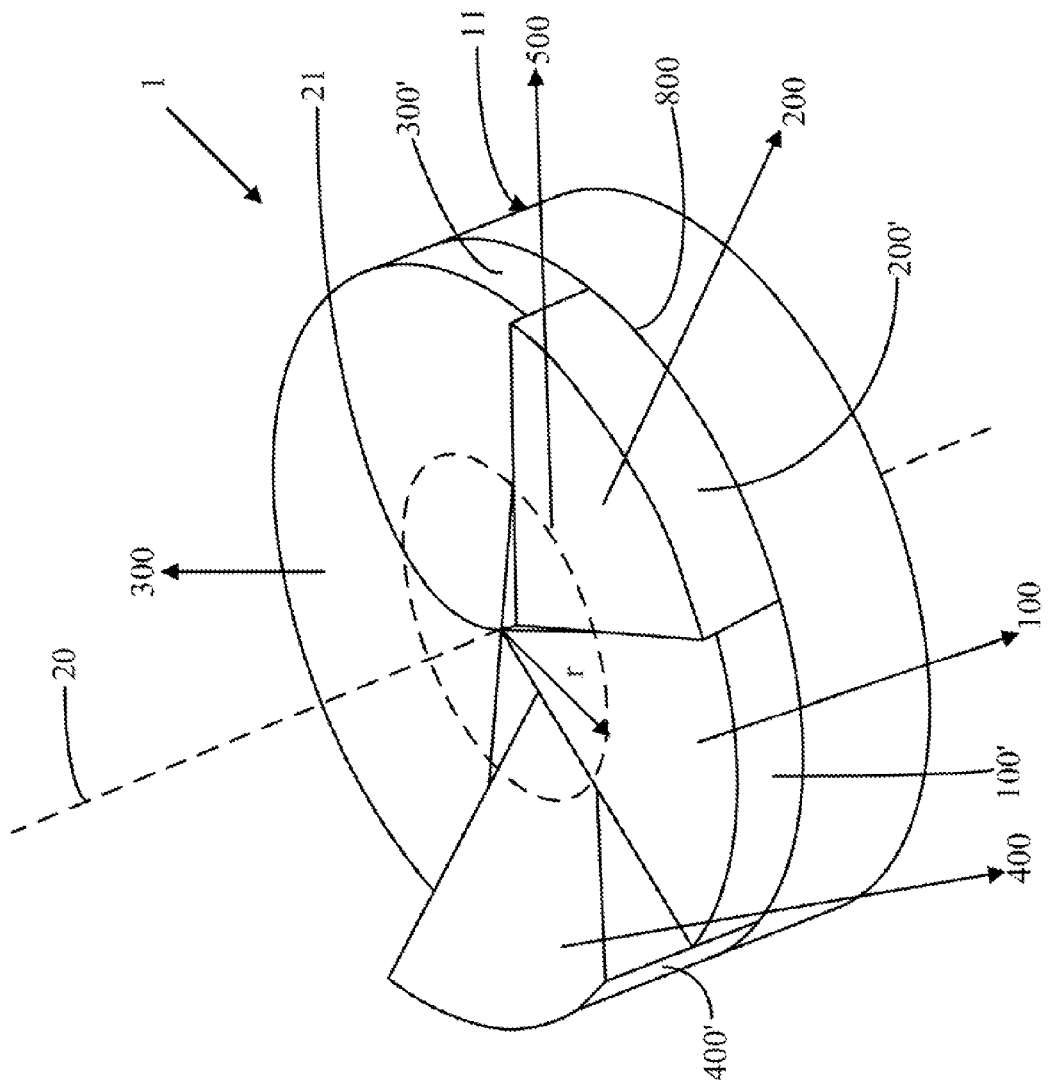
FIG. 1 depicts an appearance diagram of an embodiment of a polygon mirror device with discontinuous angles of reflections according to the present invention.
Figure 2:
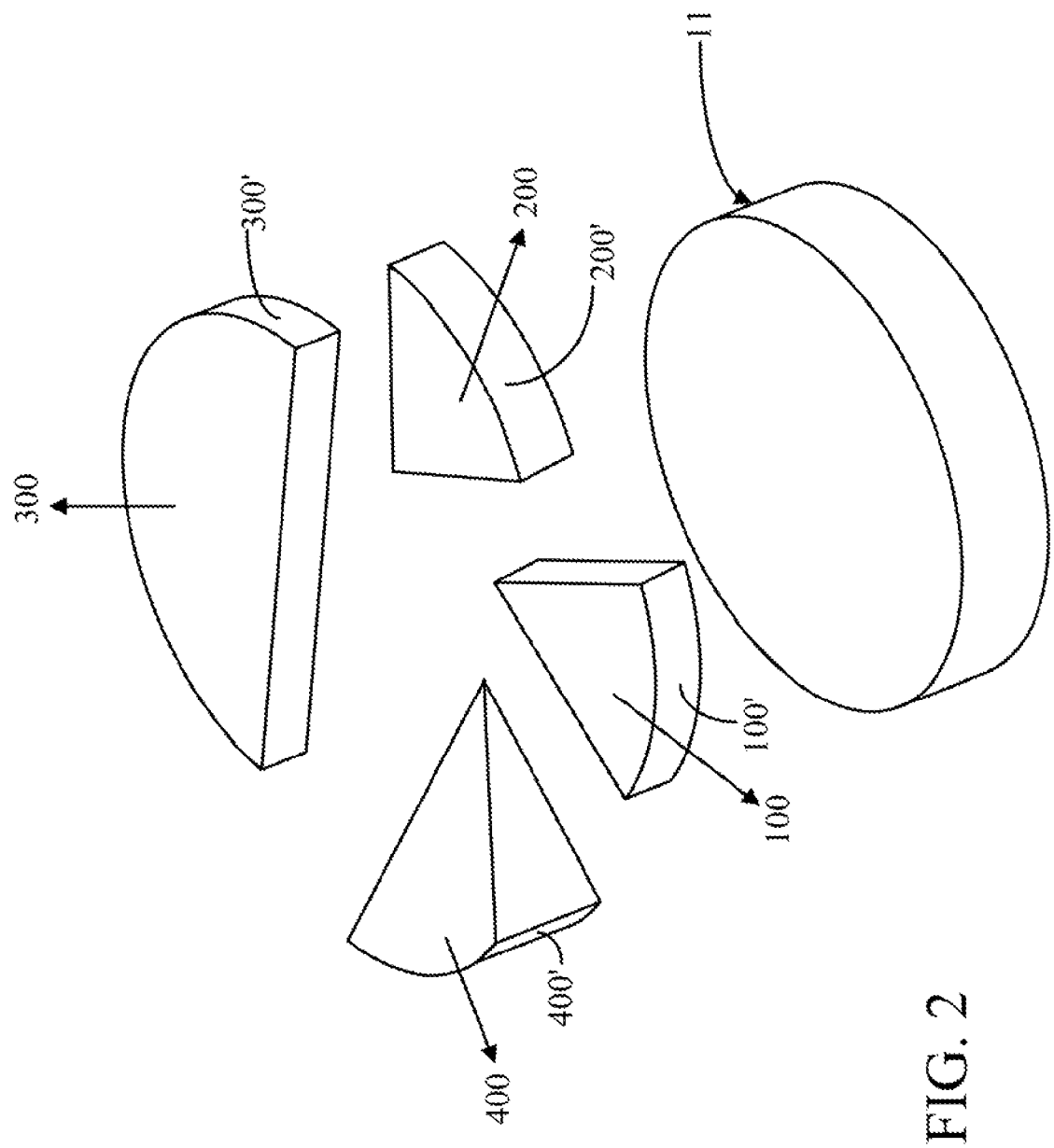
FIG. 2 depicts an explosive diagram of the polygon mirror device with discontinuous angles of reflections according to the present invention.

Please refer to FIG. 1 and FIG. 2. FIG. 1 depicts an appearance diagram of an embodiment of a polygon mirror device with discontinuous angles of reflections according to the present invention. FIG. 2 depicts an explosive diagram of the polygon mirror device with discontinuous angles of reflections shown in FIG. 1. The polygon mirror device with discontinuous angles of reflections of the present invention comprises a rotatable base 1. In this embodiment, the appearance of the base 1 can be a column 11. The column 11 has a central axis 20 as a rotation axis of the base 1. However, the column appearance is not a limitation to the base 1 of the present invention. Other appearance also can be considered and utilized for the base 1 in the present invention. According to the present invention, the column 11 has at least one axial end. A reference plane 800 which is approximately perpendicular to the rotation axis 20 is formed on the axial end. A center 21 is defined by the intersection of the rotation axis 20 and the reference plane 800.

The polygon mirror device with discontinuous angles of reflections of the present invention further comprises a plurality of reflectors 100, 200, 300, 400. The multiple reflectors 100, 200, 300, 400 are positioned circularly around the center 21 on the reference plane 800 on the axial end of the column 11. In this embodiment, each of the reflectors 100, 200, 300, 400 is formed as one of the sector blocks 100', 200', 300', 400' correspondingly. These sector blocks 100', 200', 300', 400' jointly compose an outline which accord with the round surface of the column 11. These sector blocks 100', 200', 300', 400' are divided by the radius lines extending out from the center 21 and circularly arranged around the center 21. That is to say, in this embodiment, each of the sector blocks 100', 200', 300', 400' or each of the reflectors 100, 200, 300, 400 is defined by two radius lines or two radial lines extending radically from the center 21. A vertex angle at the intersection (the coincidental position of the center 21) of the aforesaid two lines is predeterminedly specific and the sector blocks 100', 200', 300', 400' or the reflectors 100, 200, 300, 400 are circularly arranged around the center 21. However, the sector appearances are not limitation to the blocks 100', 200', 300', 400' of the present invention, any appearance for the reflectors 100, 200, 300, 400 also can be considered and utilized in the present invention, as long as they can be circularly arranged around the center 21 and rotatable with the base 1 around the central axis 20. For example, the sector blocks 100', 200', 300', 400' can stretch out the outline of the round surface of the column 11.

The reflectors 100, 200, 300, 400 can be integrated on the reference plane 800 formed on and fixed to the axial end surface of the base 1 in any proper means. Therefore, the reflectors 100, 200, 300, 400 can rotate with the base 1 around the central axis 20. For example, an adhesive can be utilized. Alternatively, the reflectors 100, 200, 300, 400 also can be monolithic molded on the reference plane 800 formed on the axial end surface of the base 1.

Moreover, the reflectors 100, 200, 300, 400 can define a common contour line 500 at a plane 810 parallel with the reference plane 800 (shown in FIG. 2). In this embodiment of the present invention, the contour line 500 is a circle positioned around the center 21 concentrically and parallel with the reference plane 800. The circle has a predetermined radius r relative to center 21.

According to the present invention, each of the reflectors 100, 200, 300, 400 tilts relative to the contour line 500 with a specific angle. Therefore, each of the reflectors 100, 200, 300, 400 tilts relative to the reference plane 800 (and the plane 810) with each angle as indicated by dot lines in FIG. 3.

As aforementioned, the sector blocks 100', 200', 300', 400' constitute the reflectors 100, 200, 300, 400 respectively. Therefore, there will be a plurality of reflectors positioned on the reference plane 800 of the column 11. Herein, for simplifying the explanation of the present invention, these reflectors are named a first reflector 100, a second reflector 200, a third reflector 300 and a fourth reflector 400. The first reflector 100, the second reflector 200, the third reflector 300 and the fourth reflector 400 tilt relative to the contour line 500 with respective angles to form respective included angles correspondingly. The first reflector 100, the second reflector 200, the third reflector 300 and the fourth reflector 400 are circularly arranged around the rotation axis 20 (or the center 21). Moreover, though, four reflectors 100, 200, 300, 400 are illustrated in this embodiment. However, the quantity of the reflectors is not limited by four. More and less can be possible for the present invention. The real amount of the reflectors can be determined by actual design requirements.

Figure 3:
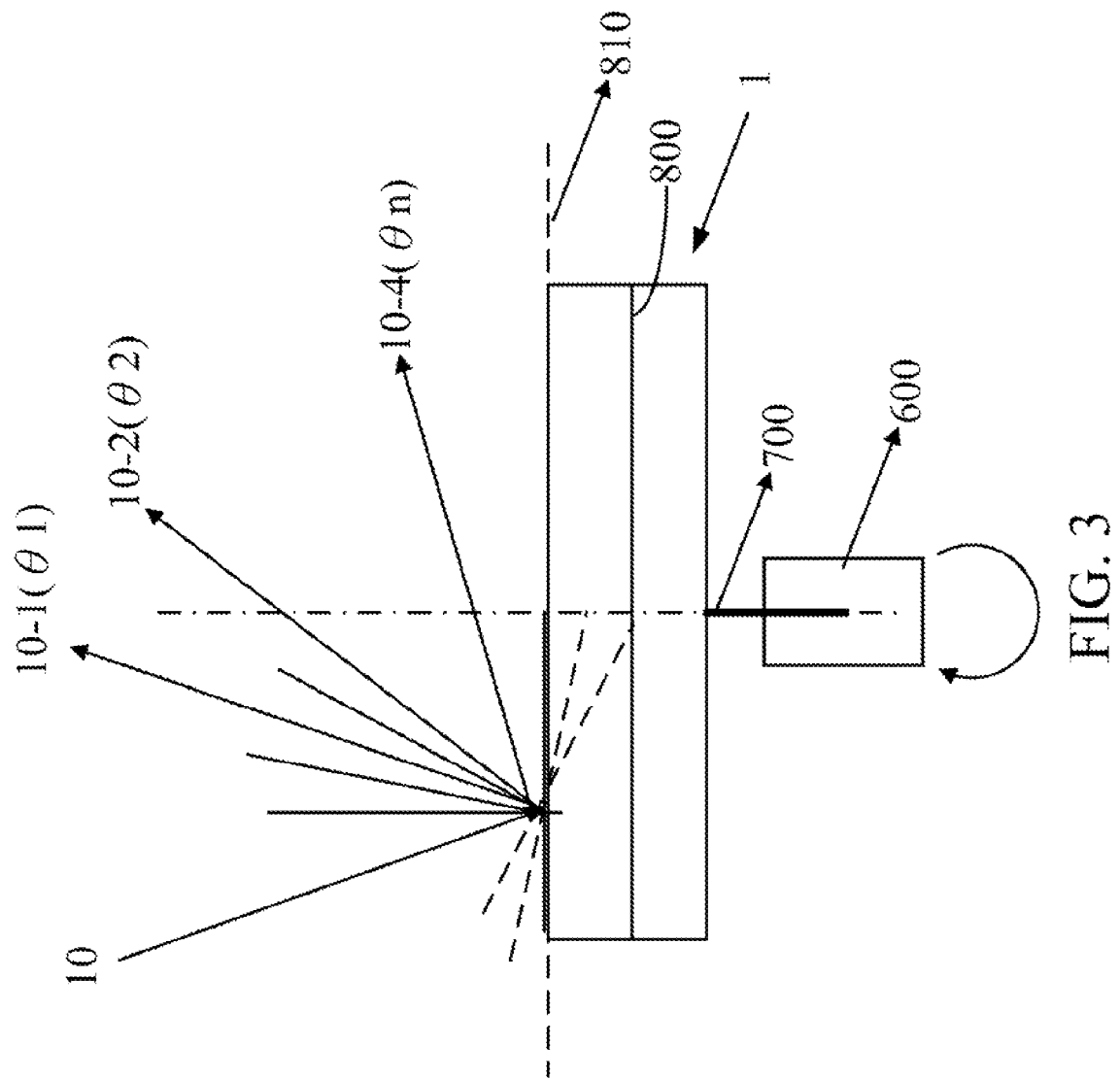
FIG. 3 depicts a side view diagram of the polygon mirror device with discontinuous angles of reflections according to the present invention shown in FIG. 1.

FIG. 3 depicts a side view diagram of the polygon mirror device with discontinuous angles of reflections according to the present invention shown in FIG. 1. As shown in FIG. 3, the base 1 of the polygon mirror device can be rotated around the rotation axis indicated by the center axis 20. Hereinafter, terms of the rotation axis and the center axis are equivalent. There are several well-known ways to realize the rotation of the base 1 around the rotation axis 20. For example, a motor 600 can be connected to the base 1 through a motor shaft 700. The motor shaft 700 of the motor 600 is coincided with the rotation axis 20 of the base 1. When the motor shaft 700 of the motor 600 rotates as indicated by the arrowhead in FIG. 3, the base 1 can be driven around the rotation axis 20. According to one embodiment of the present invention, the motor 600 can be a stepping motor. Other rotation devices which can properly control the rotation also can be considerable.

Meanwhile, the reflectors 100, 200, 300, 400 are tilted relative to the reference plane 800 with respective angles and positioned on the reference plane 800 of the column 11 of the base 1. When the base 1 is rotated, the reference plane 800 is also rotated around the center 21 coinciding with the rotation axis 20, therefore, the reflectors 100, 200, 300, 400 are rotated around center 21 or the rotation axis 20. With a proper control, the reflectors 100, 200, 300, 400 are moved (rotated) to a reflecting location circularly with a predetermined procedure.

According to the present invention, a light beam 10 from the light source is projected to the contour line 500 of the reference plane 800 of the column 11 with a constant angle and a regular direction. In another word, the light beam 10 is projected to the aforesaid reflecting location where the reflectors 100, 200, 300, 400 are moved to. Accordingly, the light beam 10 is reflected with an angle of reflection according a specific angle of the reflector which is at the reflecting location. The reflect periods of the light beam 10 by the reflectors 100, 200, 300, 400 are determined by the surface areas of the reflectors 100, 200, 300, 400. The angle of reflection is determined by the respective included angles relative to the reference plane 800 and the angle of incidence of the light beam 10 to the reflecting location. When the reflectors 100, 200, 300, 400 are moved to the reflecting location with the aforesaid predetermined procedure, the light beam 10 is reflected with a desired angle of reflection in a required period of time according to the arrangement, the respective surface areas of the reflectors 100, 200, 300, 400 circularly around the motor shaft 700 or the center axis 20 with the aforesaid predetermined procedure. As aforementioned, the motor 60 can be a stepping motor in this embodiment. Therefore, the aforesaid predetermined procedure can be determined by controlling the rotation of the motor 60. For example, providing several pulses in a forward direction and then providing another several pulses in the reverse direction during the required period of time.

As the first reflector 100, the second reflector 200, the third reflector 300 and the fourth reflector 400 are rotated around the rotation axis or the center axis 20, as aforementioned, the light beam 10 is projected to the contour line 500, i.e. the contour line 500 is a locus on the reference plane 800 formed by the projected light beam 10 when the column 11 is rotated. The reflectors 100, 200, 300, 400 reflect the light beam 10 with different angles of reflections respectively according to the angles of the reflectors 100, 200, 300, 400 relative to the contour line 500 when the reflectors 100, 200, 300, 400 are rotated in the forward direction or in the reverse direction according to the aforesaid predetermined procedure. For example, as shown in FIG. 3, the first reflector 100 reflects the light beam 10 with a first angle of reflection $\theta_1$ and generates a reflected light beam 10-1 when the light beam 10 is projected to the first reflector 100; the second reflector 200 reflects the light beam 10 with a second angle of reflection $\theta_2$ and generates a reflected light beam 10-2 when the light beam 10 is projected to the second reflector 200; the third reflector 300 reflects the light beam 10 with a third angle of reflection $\theta_3$ and generates a reflected light beam 10-3 when the light beam 10 is projected to the third reflector 300; the fourth reflector 400 reflects the light beam 10 with a fourth angle of reflection $\theta_4$ and generates a reflected light beam 10-4 when the light beam 10 is projected to the fourth reflector 400.

As the amount of the reflectors on the reference plane 800 becomes more than four, the reference plane 800 still can be rotated around the rotation axis 20 according to a predetermined procedure. And, the light beam 10 still can be reflected with different angles of reflections, such as $\theta_1, \theta_2, \theta_3 \ldots \theta_{(n-1)}, \theta_n$. Furthermore, the first reflector 100, the second reflector 200, the third reflector 300 and the fourth reflector 400 can be enacted to reflect the light beam 10 to a specific place, for example, a specific plane surface outside the polygon mirror device with discontinuous angles of reflections of the present invention to form an image.

Figure 4:
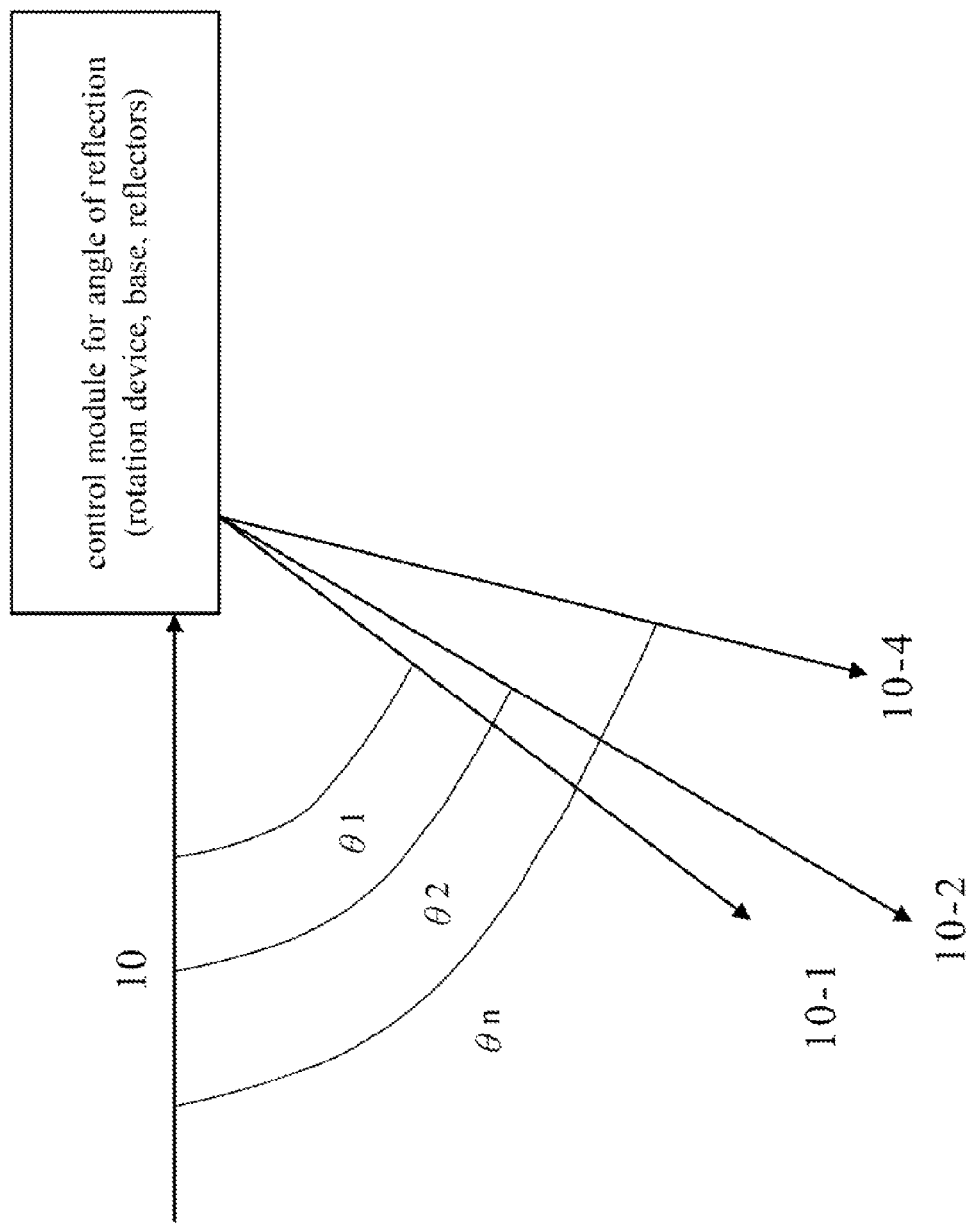
FIG. 4 depicts a schematic diagram of how the device of the present invention discontinuously changes angles of reflections.

Please refer to FIG. 4, which depicts a schematic diagram of how the device of the present invention discontinuously changes angles of reflections. The first reflector 100, the second reflector 200, the third reflector 300 and the fourth reflector 400 have respective included angles relative to the reference plane 800, i.e. respective tilt angles relative to the contour line 500. In other word, the respective normal vectors of the first reflector 100, the second reflector 200, the third reflector 300 and the fourth reflector 400 have respective included angles relative to the rotation axis 20 and also around the rotation axis 20. As shown in FIG. 4, when the light beam 10 is projected to the first reflector 100 of the base 1, the reflected light beam 10-1 with a first angle of reflection $\theta_1$ is acquired. The first angle of reflection $\theta_1$ represents an included angle $\theta_1$ between the reflected light beam 10-1 and the projected light beam 10. Similarly, when the light beam 10 is projected to the second reflector 200, the reflected light beam 10-2 with the second angle of reflection $\theta_2$ relative to the projected light beam 10 is acquired; when the light beam 10 is projected to the third reflector 300, the reflected light beam 10-3 (not shown) with the third angle of reflection $\theta_3$ relative to the projected light beam 10 is acquired; when the light beam 10 is projected to the fourth reflector 400, the reflected light beam 10-4 with the fourth angle of reflection $\theta_4$ relative to the projected light beam 10 is acquired.

Figure 5:
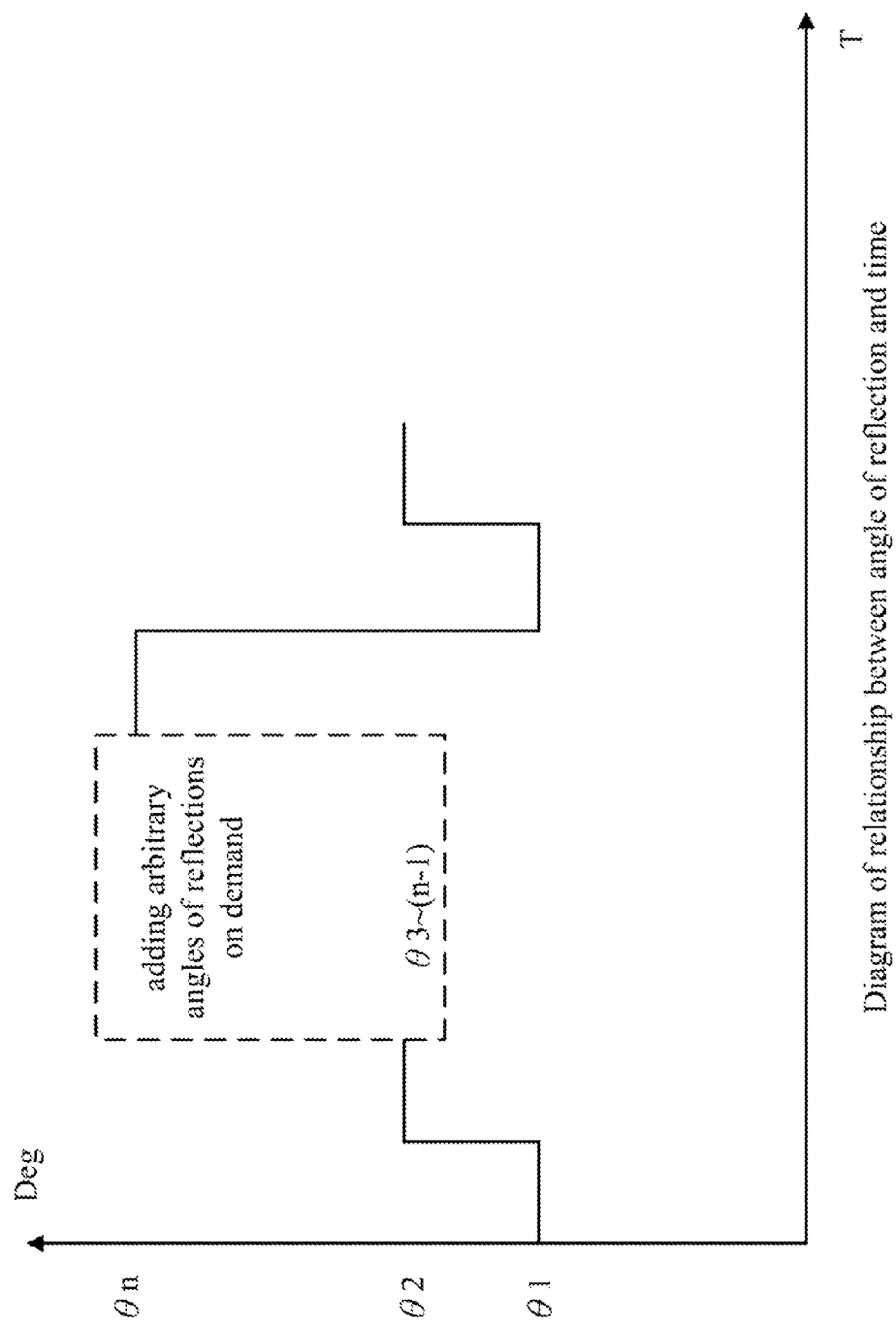
FIG. 5 shows a relation diagram of time and the angle of reflection which is discontinuously changed.

Please refer to FIG. 5, which shows a relation diagram of time and the angles of reflections which is discontinuously changed. As aforementioned, the stepping motor 60 can be controlled according to the aforesaid predetermined procedure with providing pulses of predetermined amount and polarities thereto. With the aforesaid predetermined procedure, the light beam 10 is reflected with certain angles of reflections. Meanwhile, with the arrangement of the first reflector 100, the second reflector 200, the third reflector 300 and the fourth reflector 400 and according to respective surface areas thereof, the relation of time and the angles of reflections can be arbitrarily controlled with cooperating the rotation of the motor 60. Furthermore, the angles of reflections can be increased arbitrarily with additional reflectors.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A polygon mirror device with discontinuous angles of reflections, reflecting a light beam from a light source, comprising:
   a rotation device;
   a base, having a rotation axis, connected with the rotation device for rotating base to circle the rotation axis by the rotation device and having an axial end for defining a reference plane approximately perpendicular to the rotation axis; and
   a plurality of reflectors, tilted relative to the reference plane with respective angles to form respective included angles and positioned on the reference plane circularly around the rotation axis to selectively move at least one of the reflectors to a reflecting location for receiving the light beam from the light source and reflecting the light beam with an angle of reflection when the rotation device rotates the base around the rotation axis, wherein the rotation device is a stepping motor.

2. The polygon mirror device with discontinuous angles of reflections of claim 1, wherein the reflectors have a common contour line surrounding the rotation axis at a plane parallel with the reference plane.

3. The polygon mirror device with discontinuous angles of reflections of claim 2, wherein the contour line is a circle positioned relative to the rotation axis concentrically.

4. The polygon mirror device with discontinuous angles of reflections of claim 2, wherein the reflecting location is at the contour line to make the contour line as a locus on the base formed by the light beam.

5. The polygon mirror device with discontinuous angles of reflections of claim 1, wherein the base further comprises a column having at least one axial end surface to form the reference plane.

6. The polygon mirror device with discontinuous angles of reflections of claim 1, wherein the reflectors rotate to the reflecting location circularly around the rotation axis with the respective included angles relative to the reference plane according to a predetermined procedure.

7. The polygon mirror device with discontinuous angles of reflections of claim 6, wherein the predetermined procedure is determined by controlling rotation of the rotation device.

8. The polygon mirror device with discontinuous angles of reflections of claim 1, wherein the stepping motor is connected with the rotation axis of the base by a shaft.

9. The polygon mirror device with discontinuous angles of reflections of claim 1, wherein each reflector further comprises a sector block defined by two lines extending radically from the rotation axis and a vertex angle determined with the two lines.

10. The polygon mirror device with discontinuous angles of reflections of claim 9, wherein each reflector composed by the sector blocks has each surface area according to the vertex angle.

11. The polygon mirror device with discontinuous angles of reflections of claim 1, wherein the reflectors rotate to the reflecting location circularly around the rotation axis according to a predetermined procedure and the predetermined procedure is determined by arrangement of the reflectors around the rotation axis and respective surface areas of the reflectors.

12. The polygon mirror device with discontinuous angles of reflections of claim 1, wherein the reflectors are monolithic molded on an axial end surface of the base.

13. A polygon mirror device with discontinuous angles of reflections, reflecting a light beam from a light source, comprising:
   a rotation device;
   a base, having a rotation axis, connected with the rotation device for rotating base to circle the rotation axis by the rotation device and having an axial end for defining a reference plane approximately perpendicular to the rotation axis; and
   a plurality of reflectors, tilted relative to the reference plane with respective angles to form respective included angles and positioned on the reference plane circularly around the rotation axis to selectively move at least one of the reflectors to a reflecting location for receiving the light beam from the light source and reflecting the light beam with an angle of reflection when the rotation device rotates the base around the rotation axis, wherein the reflectors are integrated to an axial end surface of the base by an adhesive.

* * * * *